(12) United States Patent
Marcigliano et al.

(10) Patent No.: US 8,257,225 B2
(45) Date of Patent: Sep. 4, 2012

(54) CONTROL METHOD FOR CARRYING OUT A GEAR UPSHIFTING IN AN AUTOMATIC MANUAL TRANSMISSION HAVING A DUAL-CLUTCH GEARBOX

(75) Inventors: Francesco Marcigliano, Maranello (IT); Luca Poggio, Casalecchio di Reno (IT)

(73) Assignee: Ferrari S.p.A., Modena (IT)

( * ) Notice: Subject to any disclaimer, the term of this patent is extended or adjusted under 35 U.S.C. 154(b) by 147 days.

(21) Appl. No.: 12/726,536

(22) Filed: Mar. 18, 2010

(65) Prior Publication Data

US 2011/0015035 A1    Jan. 20, 2011

(30) Foreign Application Priority Data

Mar. 18, 2009  (IT) ............................... BO2009A0159

(51) Int. Cl.
*B60W 10/00* (2006.01)
(52) U.S. Cl. .......................................................... 477/78
(58) Field of Classification Search ................... 477/77, 477/78

See application file for complete search history.

(56) References Cited

U.S. PATENT DOCUMENTS

| | | | | |
|---|---|---|---|---|
| 5,890,392 | A * | 4/1999 | Ludanek et al. | 74/331 |
| 6,679,134 | B2 * | 1/2004 | Shigyo | 74/336 R |
| 6,832,978 | B2 * | 12/2004 | Buchanan et al. | 477/174 |
| 6,869,382 | B2 * | 3/2005 | Leising et al. | 477/77 |
| 6,881,171 | B2 * | 4/2005 | Kuhstrebe et al. | 477/78 |
| 6,887,184 | B2 * | 5/2005 | Buchanan et al. | 477/174 |
| 6,949,051 | B2 * | 9/2005 | Katakura | 477/175 |

(Continued)

FOREIGN PATENT DOCUMENTS

| | | |
|---|---|---|
| DE | 102004033716 | 2/2006 |
| EP | 1450076 | 8/2004 |
| EP | 1507092 | 2/2005 |

OTHER PUBLICATIONS

Italian Search Report based on Italian Application No. ITBO20090159, Ministero dello Sviluppo Economico, Berlin, Oct. 21, 2009.

*Primary Examiner* — Dirk Wright
(74) *Attorney, Agent, or Firm* — Bryan A. Santarelli; Graybeal Jackson LLP

(57) ABSTRACT

An embodiment of a control method for carrying out a gear shifting in an automatic manual transmission having a dual-clutch gearbox to pass from a current shorter gear to a successive longer gear; the embodiment includes the steps of: receiving a gear shifting command; opening a first clutch associated to the current gear; closing a second clutch associated to the successive gear in a same first moment; finishing the opening of the first clutch associated to the current gear and finishing the closure of the second clutch associated to the successive gear in a same closing moment; keeping the rotation speed of the drive shaft of the engine constant and equal to an initial value imposed by the gear ratio of the current gear until the closing moment in which the opening of the first clutch is completed; after the closing moment, progressively decreasing the rotation speed of the drive shaft of the engine from the initial value imposed by the gear ratio of the current gear to a final value imposed by the gear ratio of the successive gear; and temporarily overlengthening the second clutch after the closing moment so that the second clutch temporarily transmits an additional torque which determines a progressive reduction of the rotation speed of the drive shaft from the initial value to the final value.

4 Claims, 6 Drawing Sheets

U.S. PATENT DOCUMENTS

| | | | |
|---|---|---|---|
| 7,086,989 B2* | 8/2006 | Siebigteroth et al. | 477/109 |
| 7,171,867 B2* | 2/2007 | McCrary et al. | 74/331 |
| 7,510,506 B2* | 3/2009 | Kupper et al. | 477/180 |
| 7,779,714 B2* | 8/2010 | Baldwin | 74/336 R |
| 7,962,267 B2* | 6/2011 | Honma et al. | 701/51 |
| 8,079,936 B2* | 12/2011 | MacFarlane et al. | 477/109 |

* cited by examiner

CONTROL METHOD FOR CARRYING OUT A GEAR UPSHIFTING IN AN AUTOMATIC MANUAL TRANSMISSION HAVING A DUAL-CLUTCH GEARBOX

PRIORITY CLAIM

The instant application claims priority to Italian Patent Application No. BO2009A000159, filed Mar. 18, 2009, which application is incorporated herein by reference in its entirety.

TECHNICAL FIELD

An embodiment of the present invention relates to a control method for carrying out a gear upshifting in an automatic manual transmission having a dual-clutch gearbox.

BACKGROUND

An automatic manual transmission (commonly called "AMT") having a dual-clutch gearbox comprises a pair of independent primary shafts, which are coaxial to each other and inserted one within the other; two coaxial clutches, each of which is adapted to connect a respective primary shaft to a drive shaft of an thermal internal combustion engine; and at least one secondary shaft which transmits the motion to the driving wheels and is couplable to the primary shafts by means of respective pairs of gears, each of which defines a gear.

When shifting gear, the current gear couples the secondary shaft to a primary shaft, while the successive gear couples the secondary shaft to the other primary shaft; therefore, the gears are shifted by interconnecting the two clutches, i.e., by opening the clutch associated with the current gear, while closing the clutch associated with the successive gear.

Patent applications DE102004033716A1, EP1450076A2, and EP1507092A1, which are incorporated by reference, describe a control method for carrying out a gear upshifting in an automatic manual transmission having a dual-clutch gearbox.

SUMMARY

An embodiment of the present invention provides a control method for carrying out a gear upshifting in an automatic manual transmission having a dual-clutch gearbox, which control method maximizes the performance in acceleration while being easy and cost-effective to be implemented.

BRIEF DESCRIPTION OF THE DRAWINGS

At least one embodiment of the present invention will now be described with reference to the accompanying drawings, which illustrate a non-limiting embodiment thereof, in which.

DETAILED DESCRIPTION

Figure 1:
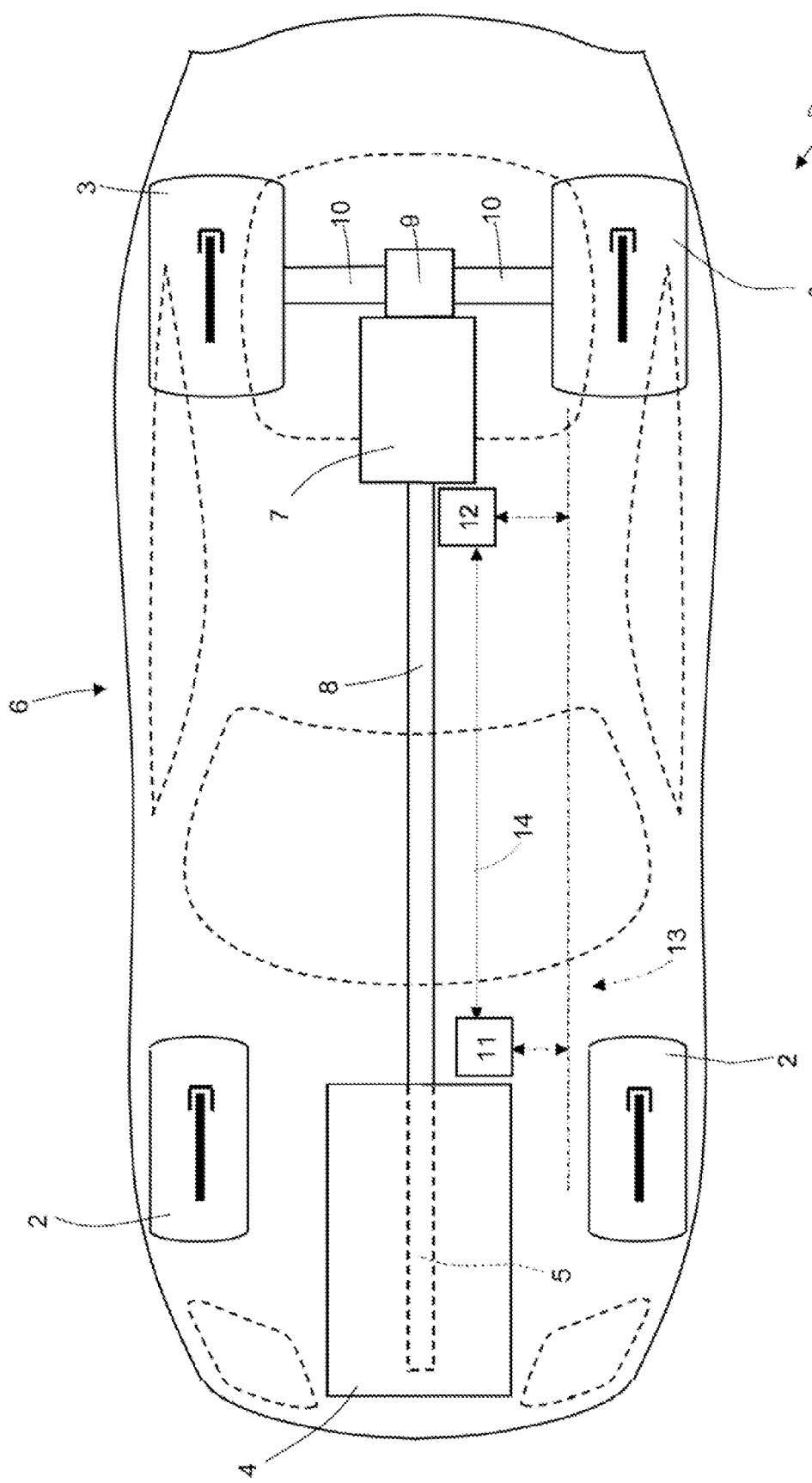
FIG. 1 is a diagrammatic, top view of a rear wheel drive vehicle having an automatic manual transmission which is controlled according to a control method of an embodiment of the present invention.

In FIG. 1, numeral 1 indicates as a whole a vehicle (in particular, a car) having two front wheels 2 and two rear drive wheels 3; an internal combustion engine 4 is placed at the front, which is provided with a drive shaft 5 and produces a torque $T_E$ which is transmitted to the rear drive wheels 3 by means of an embodiment of an automatic manual transmission 6. Transmission 6 comprises a dual-clutch gearbox 7 arranged at the rear axle and a transmission shaft 8 which connects the drive shaft 5 to an inlet of gearbox 7. Gearbox 7 is connected in cascade to a self-locking differential 9, from which a pair of axle shafts 10 depart, each of which is integral with a rear drive wheel 3.

Vehicle 1 comprises a control unit 11 of the engine 4, which governs engine 4, a control unit 12 of the transmission 6 which governs transmission 6, and a BUS line 13 which is made according to CAN (Car Area Network) protocol, is extended to the entire vehicle 1 and permits the control units 11 and 12 to dialogue with each other. In other words, the control unit 11 of the engine 4 and the control unit 12 of the transmission 6 are connected to the BUS line 13 and may thus communicate with each other by means of messages forwarded over the BUS line 13 itself. Moreover, the control unit 11 of the engine 4 and the control unit 12 of the transmission 6 may be directly connected to each other by means of a dedicated synchronizing cable 14, which is capable of directly transmitting a signal from the control unit 12 of the transmission 6 to the control unit 11 of the engine 4 without delays introduced by the BUS line 13.

Figure 2:
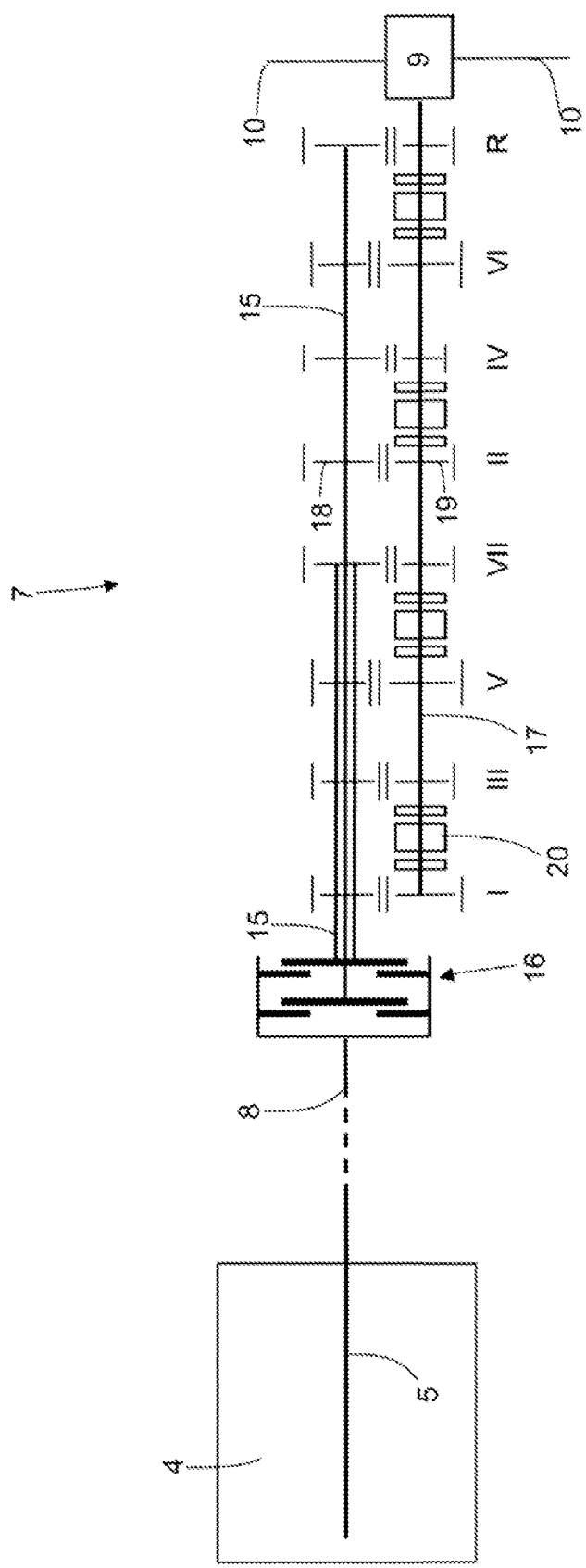
FIG. 2 is a diagrammatic view of the automatic manual transmission in FIG. 1 having a dual-clutch gearbox.

As shown in FIG. 2, an embodiment of the dual-clutch gearbox 7 comprises a pair of independent primary shafts 15 which are coaxial to each other and inserted one within the other. Moreover, the dual-clutch gearbox 7 comprises two coaxial clutches 16, each of which is adapted to connect a respective primary shaft 15 to the drive shaft 5 of the internal combustion engine 4 by interposing the transmission shaft 8. Each clutch 16 is in an oil bath and is therefore pressure-controlled (i.e., the opening/closing degree of clutch 16 is determined by the oil pressure within the clutch 16 itself); according to an alternative embodiment, each clutch 16 is dry and is therefore position-controlled (i.e., the opening/closing degree of clutch 16 is determined by the position of a movable element of the clutch 16 itself). The dual-clutch gearbox 7 comprises a single secondary shaft 17 connected to differential 9 which transmits the motion to the rear drive wheels 3; according to an alternative and equivalent embodiment, the dual-clutch gearbox 7 comprises two secondary shafts 17 both connected to differential 9.

The dual-clutch gearbox 7 has seven forward gears indicated by Roman numerals (first gear I, second gear II, third gear III, fourth gear IV, fifth gear V, sixth gear VI and seventh gear VII), and a reverse gear (indicated by the letter R). The primary shaft 15 and the secondary shaft 17 are mechanically coupled to each other by means of a plurality of gear pairs, each of which defines a respective speed and comprises a primary gear 18 mounted to the primary shaft 15 and a secondary gear 19 mounted to the secondary shaft 17. In order to allow the correct operation of the dual-clutch gearbox 7, all the odd speeds (first gear I, third gear III, fifth gear V, seventh gear VII) are coupled to a same primary shaft 15, while all even speeds (second gear II, fourth gear IV, and sixth gear VI) are coupled to the other primary shaft 15.

Each primary gear 18 is keyed onto a respective primary shaft 15 to rotate, again integrally, with the primary shaft 15 itself, and permanently meshes with the respective secondary gear 19; instead, each secondary gear 19 is idly mounted to the secondary shaft 17. Moreover, the dual-clutch gearbox 7 comprises four double synchronizers 20, each of which is mounted to be coaxial the secondary shaft 17, is arranged between two secondary gears 19, and is adapted to be actuated to alternatively engage the two respective secondary gears 19 onto the secondary shaft 17 (i.e., to alternatively make the two respective secondary gears 18 angularly integral with the secondary shaft 17). In other words, each synchronizer 20 may be moved either in one direction to engage a secondary gear 19 onto the secondary shaft 17, or may be moved in the other direction to engage the other secondary gear 19 onto the secondary shaft 17.

Embodiments of methods for carrying out a gear upshifting from a current shorter gear A to a successive longer gear B are described below; i.e., current gear A has a greater gear ratio than successive gear B.

According to an embodiment, in an initial situation (i.e., before the gear shifting), a clutch 16A is closed to transmit the motion to a primary shaft 15A, which in turn transmits the motion to the secondary shaft 17 by means of the current gear A which is engaged; instead, a clutch 16B is open and thus isolates a primary shaft 15B from the transmission shaft 8. Before starting the gear upshifting, the successive gear B is engaged to connect the primary shaft 15B to the secondary shaft 17 by means of the gear B itself; such an operation is automatically performed regardless of the driver's will as soon as clutch 16B is opened at the end of the previous gear shifting. When the driver sends the command to shift the gear, gear shifting is carried out by opening the clutch 16A to disconnect the primary shaft 15A (therefore gear A) from the transmission shaft 8 (i.e., from the drive shaft 5 of the engine 4) and by simultaneously closing the clutch 16B to connect the primary shaft 15B (therefore gear B) to the transmission shaft 8 (i.e., to the drive shaft 5 of the engine 4).

Figure 3:
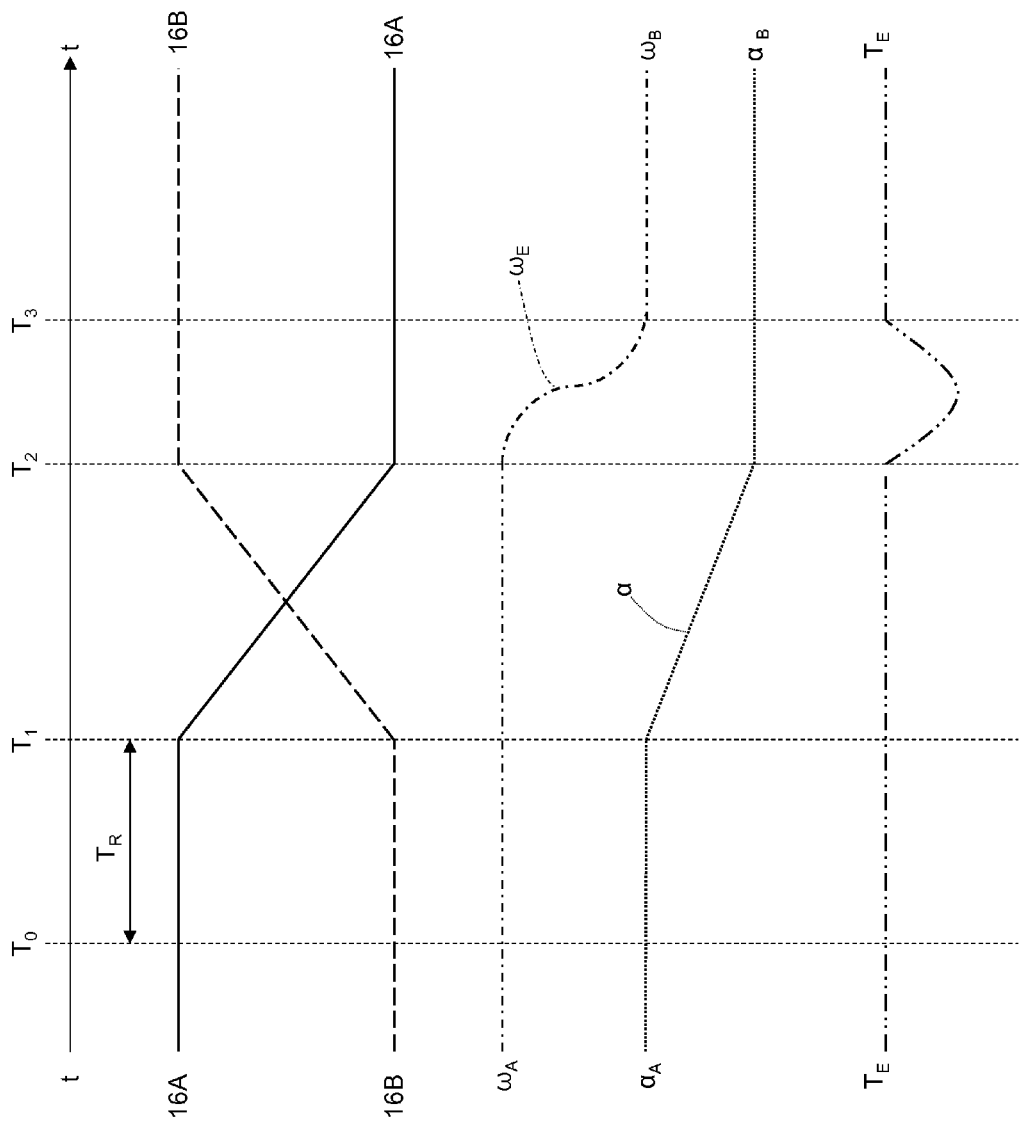
FIG. 3 shows the time evolution of the torques transmitted by the two clutches of the dual-clutch gearbox, of the rotation speed of a drive shaft of the engine, and of the longitudinal acceleration of the vehicle during a conventional gear shifting.

FIG. 3 illustrates embodiments of methods for a conventional gear shifting, in which at moment $T_0$ the driver sends the command to shift gears (typically, by acting on a lever or button located on the steering wheel or close to the steering wheel). As soon as the transmission control unit 12 receives the gear shifting command (moment $T_0$) from the driver, the transmission control unit 12 approximately immediately begins closing the clutch 16B associated with the successive gear B; however, it may be necessary to wait a certain filling time interval $T_R$ (typically between 100 and 250 thousandths of a second) in which filling the clutch 16B with oil is finished, before the clutch 16B associated with the successive gear B may begin transmitting torque to the rear drive wheels 3.

Nothing happens to the dynamics of vehicle 1 from the moment $T_0$ when the transmission control unit 12 immediately begins closing the clutch 16B to the moment $T_1$ when the clutch 16B is full of oil and is ready to begin transmitting torque (the filling time $T_R$ being expired), i.e., all the torque $T_E$ delivered by the engine 4 is completely transmitted by the clutch 16A, just as prior to the beginning of the gear shifting. The opening of clutch 16A is commanded at moment $T_1$; it is worth noting that the opening of the clutch 16A associated to the current gear A occurs without any delay, as the clutch 16A is already full of pressurized oil, and at this step it should only be partially emptied of oil.

The torque transfer occurs between the two clutches 16 between moments $T_1$ and $T_2$, i.e., the torque transmitted by clutch 16A progressively lowers while the torque transmitted by clutch 16B progressively rises, thus determining an interconnection between the two clutches 16. Clutch 16A is, for example, opened over the same time needed to approximately completely close the clutch 16B so as to achieve a symmetric interconnection which permits the overall torque transmitted to the rear drive wheels 3 (and therefore the torque delivered by the engine 4) to be kept approximately constant. At moment $T_2$, the clutch 16A is completely open (and therefore it no longer transmits torque) while clutch 16B is completely closed (and therefore it transmits all the torque).

To a first approximation, the longitudinal acceleration α of vehicle 1 is constant and equal to the value $α_A$ immediately before shifting the gears, it progressively lowers towards the value $α_B$ when shifting the gear, and to a first approximation it is constant and equal to the value $α_B$ immediately after the gear shifting. The decrease of longitudinal acceleration α of vehicle 1 when shifting gear is due to the torque $T_E$ delivered by the engine 4 substantially remaining constant and being transmitted with a progressively decreasing gear ratio (gear A is shorter than gear B) and therefore a progressively decreasing torque is applied to the rear drive wheels 3.

The rotation speed $ω_E$ of the drive shaft 5 of engine 4 is equal to the rotation speed $ω_A$ imposed by the gear ratio of the current gear A before the gear shifting, it progressively lowers towards the rotation speed $ω_B$ imposed by the gear ratio of the successive gear B when shifting gear, and is equal to the rotation speed $ω_B$ after the gear shifting. As shown in FIG. 3, the rotation speed $ω_E$ of the drive shaft 5 is kept approximately constant and equal to the rotation speed $ω_A$ until the moment $T_2$ when clutch 16A is completely open, and may be thus decreased only once the clutch 16A has been completely opened; such a method of controlling the rotation speed $ω_E$ of the drive shaft 5 aims to avoid the clutch 16A from becoming braking, i.e. from delivering a braking torque to the rear drive wheels 3.

On request of the control unit 12 of the transmission 6, the control unit 11 of the engine 4 temporarily decreases the torque $T_E$ delivered by the engine 4 itself while keeping approximately constant the torque transmitted by the clutch 16B in order to decrease the rotation speed $ω_E$ of the drive shaft 5 of engine 4 once clutch 16A has been completely opened; therefore, a difference is created between the torque $T_E$ delivered by engine 4 and the torque transmitted by clutch 16B (which is greater than the torque $T_E$ delivered by engine 4), and such a difference results in decreasing the rotation speed $ω_E$ of the drive shaft 5, which from the initial value $ω_A$ imposed by the gear ratio of the current gear A passes to the final value $ω_B$ imposed by the gear ratio of the successive gear B. In other words, both the mechanical energy delivered by the engine 4 and a portion of the kinetic energy held by the drive shaft 5, which therefore slows down, are transferred to the rear drive wheels 3 for a short time. It is worth noting that the temporary decrease of the torque $T_E$ delivered by engine 4 does not affect the longitudinal acceleration α of vehicle 1, as the torque transmitted by the clutch 16B to the rear drive wheels 3 remains approximately constant.

Figure 4:
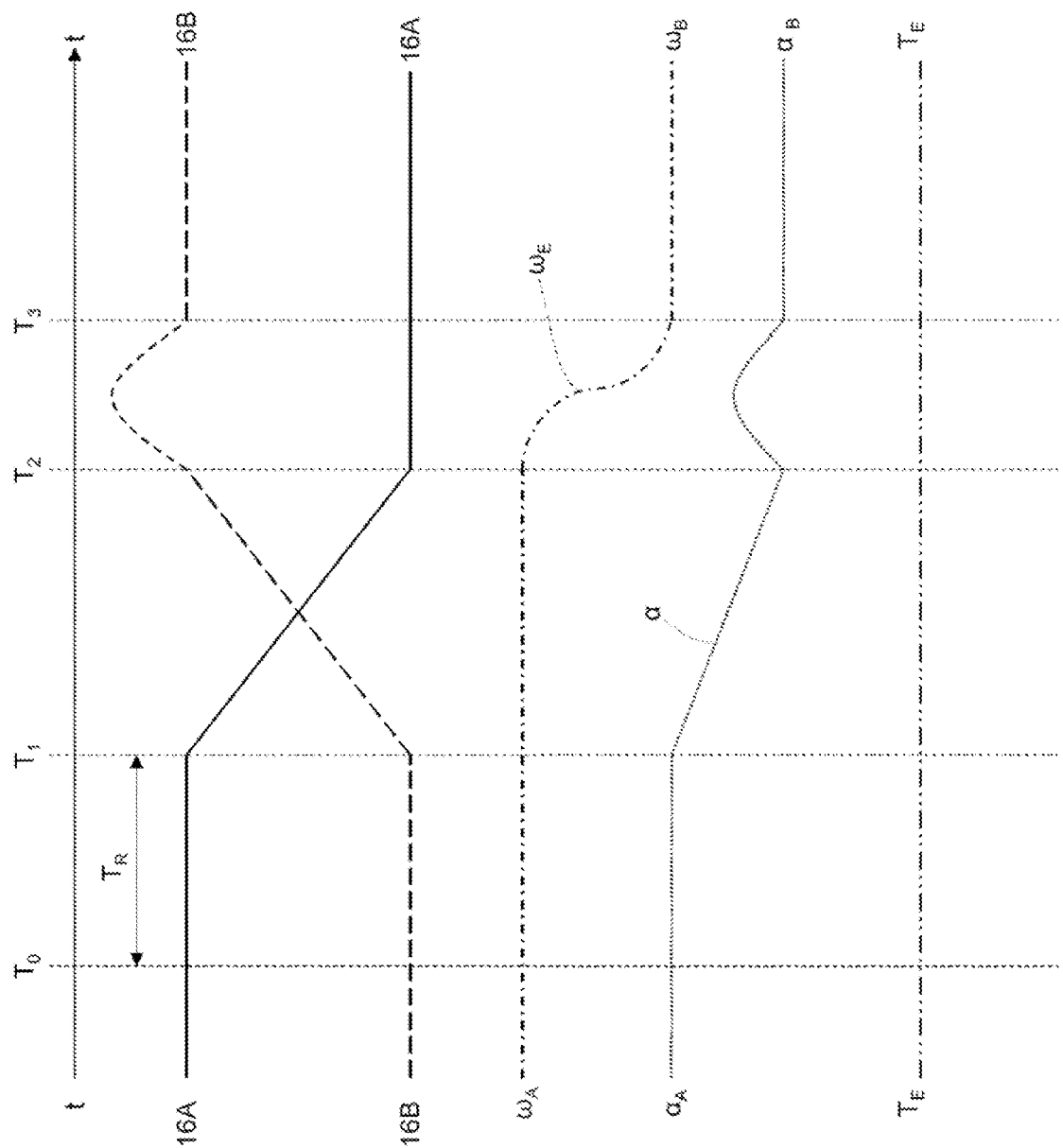
FIGS. 4-6 show the time evolution of the torques transmitted by the two clutches of the dual-clutch gearbox, of the rotation speed of a drive shaft of the engine, and of the longitudinal acceleration of the vehicle when carrying out some gear shifting according to an embodiment of the present invention.

According to a control method according to an embodiment of the present invention shown in FIG. 4, in performance driving (i.e., when maximum performance during acceleration is desired), the torque $T_E$ delivered by the engine 4 is kept approximately constant (generally equal to the maximum torque $T_E$ deliverable by engine 4 under those conditions) for decreasing the rotation speed $ω_E$ of the drive shaft 5 of the engine 4 once clutch 16A has been completely opened, and clutch 16B is temporarily overlengthened by increasing the oil pressure so as to transfer a greater torque to the rear drive wheels 3. In other words, in the case of performance driving, the torque $T_E$ delivered by the engine 4 is kept approximately constant and the torque transmitted by the clutch 16B is increased, rather than decreasing the torque $T_E$ delivered by the engine 4 by keeping approximately constant the torque transmitted by the clutch 16B to create a negative differential between the torque $T_E$ delivered by the engine 4 and the torque transmitted by the clutch 16B, so as to slow down the drive shaft 5. In other words, the clutch 16B is driven to transmit a torque to the rear drive wheels 3 which is greater than the torque $T_E$ delivered by the engine 4, which remains approximately constant so as to progressively decrease the rotation speed $\omega_E$ of the drive shaft 5 from the initial value $\omega_A$ to the final value $\omega_B$; in this situation, clutch 16B is driven to transmit both the torque $T_E$ delivered by engine 4 which is (approximately) equal to the maximum torque $T_E$ deliverable by the engine 4 under those conditions, and a further (extra) torque delivered by decreasing the kinetic energy held by the drive shaft 5 (i.e., delivered by slowing down the drive shaft 5), to the rear drive wheels 3. As is apparent in FIG. 4, the above-described method to temporarily overlengthen the clutch 16B permits an increase of performance during acceleration: the temporary increase of the torque transferred to the rear drive wheels 3 between moments $T_2$ and $T_3$ is translated into a corresponding temporary increase of the longitudinal acceleration.

It is worth noting that the above-described method to temporarily overlengthen the clutch 16B may allow obtaining increased performance, but contrarily also may cause a slight worsening of driving comfort as the increased and subsequent decreased longitudinal acceleration α in a short time interval (indicatively 100-300 milliseconds) determines an oscillating movement of the head of the vehicle occupants around the neck "hinging". The backwards (when longitudinal acceleration α increases) and forwards (when longitudinal acceleration α decreases) movement of the head of the vehicle occupants may be uncomfortably perceived when it does not occur during performance driving. Therefore, the above-described method of temporarily overlengthening the clutch 16B may be only used when the maximum performance possible is sought in sports driving.

Figure 5:
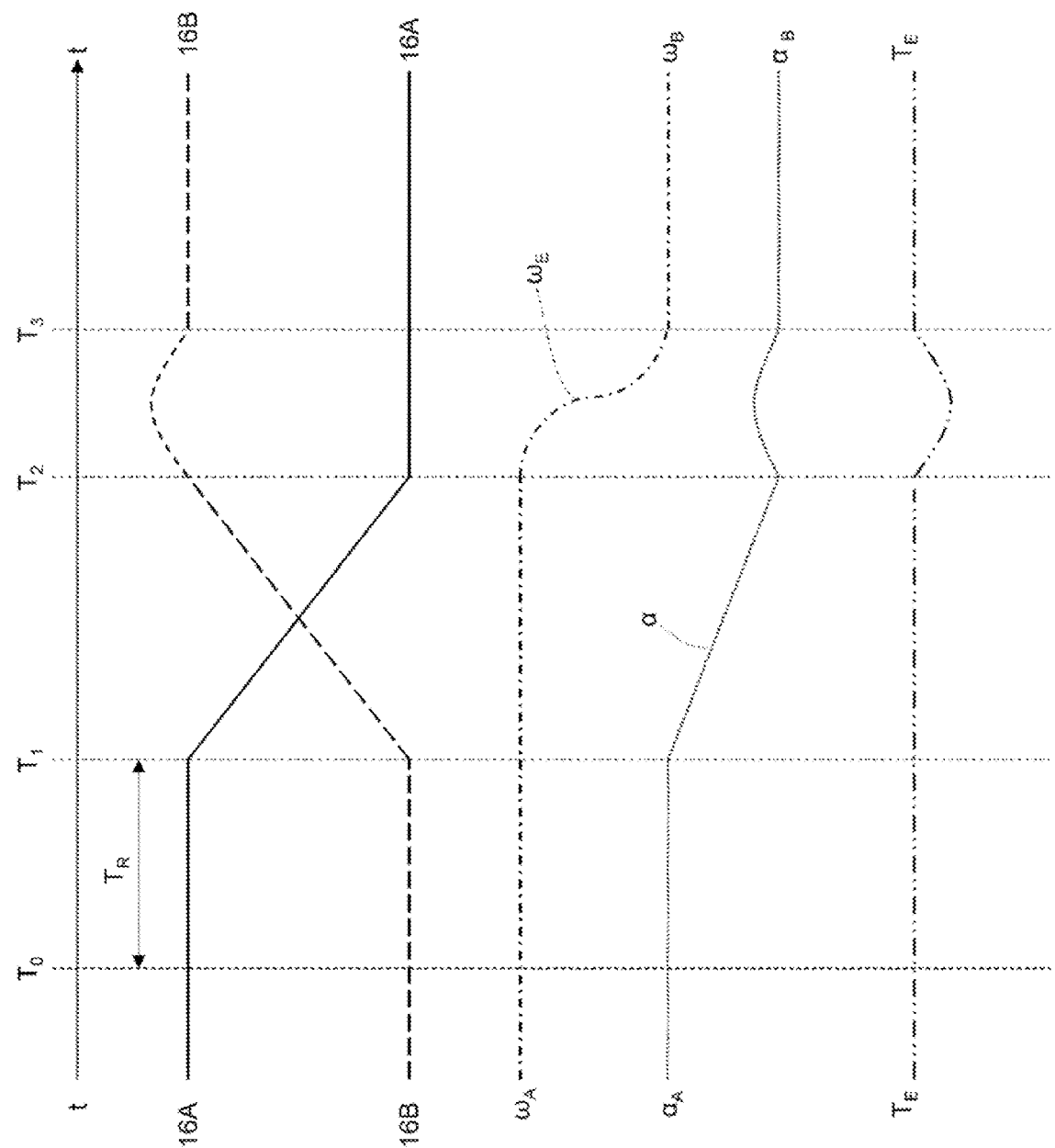
Figure 6:
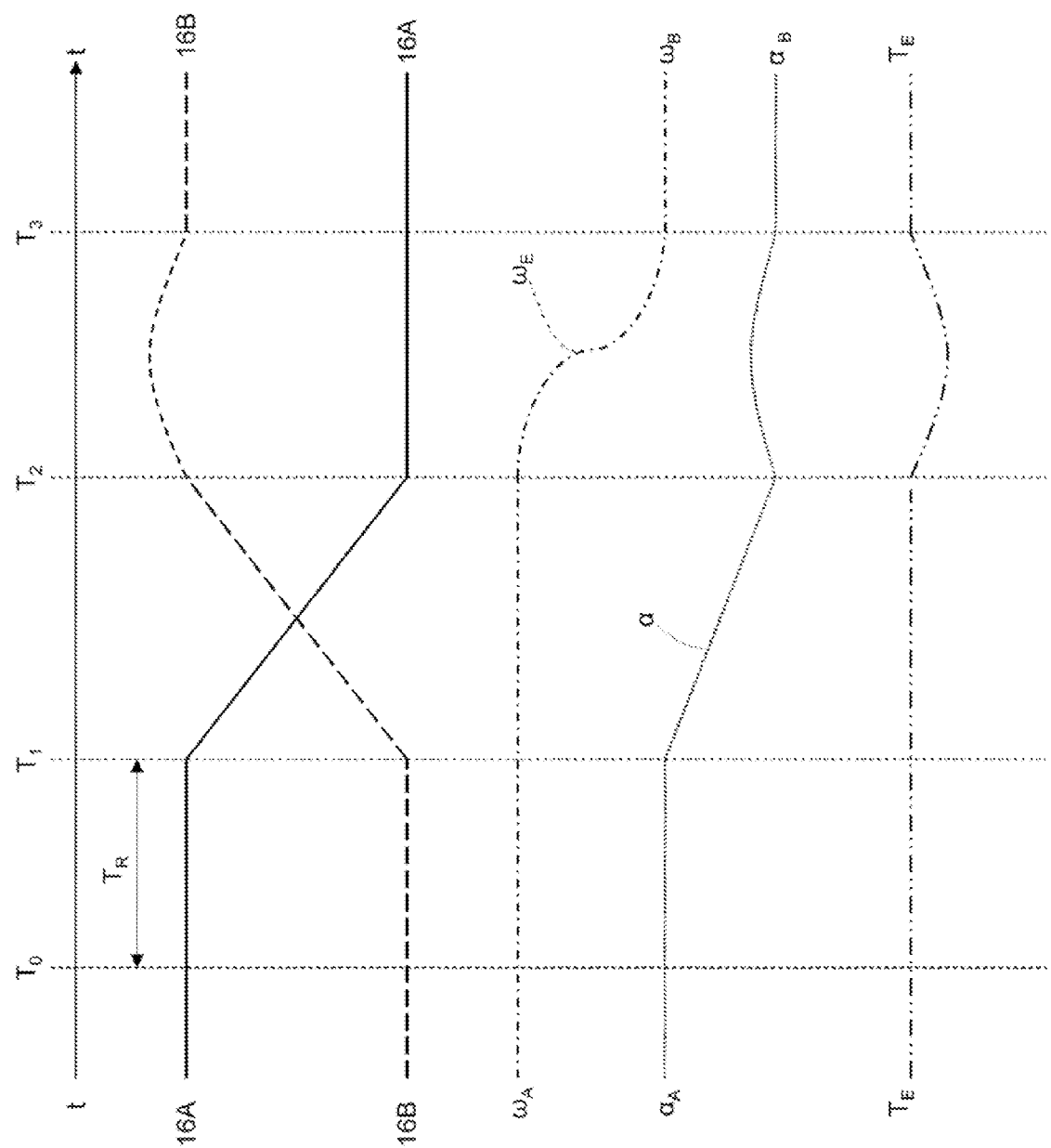

In order to restrain the comfort reduction introduced by the above-described overlengthening of clutch 16B without, however, completely renouncing the benefits in terms of performance, an embodiment of operation according to FIGS. 5 and 6 is possible. As shown in FIG. 5, both an overlengthening of clutch 16B to temporarily transmit an increased torque to the rear drive wheels 3, and a reduction of torque $T_E$ delivered by the engine 4 may be combined; thereby, the difference of longitudinal acceleration α of vehicle 1 is reduced (but not completely suppressed) and hence it is less noticeable by the occupants of vehicle 1. Alternatively, as shown in FIG. 6, the torque $T_E$ delivered by the engine 4 may not be decreased by increasing the time over which the clutch 16B is overlengthened; in other words, clutch 16B is overlengthened to transmit an additional torque of lesser intensity over a longer time interval, thereby the difference of longitudinal acceleration α of vehicle 1 is softened (but not suppressed) and hence it is less noticeable by the occupants of vehicle 1.

The control unit 12 of the transmission 6 decides how much to overlengthen the clutch 16B and how much the torque $T_E$ delivered by engine 4 is to be cut for decreasing the rotation speed $\omega_E$ of the drive shaft 5 of engine 4 once clutch 16A has been completely opened, according to the drive style, i.e. according to the settings selected by the driver (e.g., by acting on a switch indicating sports driving or leisure driving), to the engine speed of engine 4, and/or to the position of an accelerator pedal. When the engine speed of engine 4 is high and the accelerator pedal is completely thrust, for example, then it is clear that the driver is looking for maximum performance, thus the control unit 12 of the transmission 6 does not cut the torque $T_E$ delivered by the engine 4 and performs an increased overlengthening of the clutch 16B to decrease the rotation speed $\omega_E$ of the drive shaft 5 of engine 4 once clutch 16A has been completely opened; on the other hand, when the rotation speed of the engine 4 is decreased and the accelerator pedal is only slightly pressed, it is clear that the driver is not interested in performance at all, therefore the control unit 12 of the transmission 6 cuts the torque $T_E$ delivered by the engine 4 and does not overlengthen the clutch 16B for decreasing the rotation speed $\omega_E$ of the drive shaft 5 of engine 4 once clutch 16A has been completely opened. In the intermediate situations, the control unit 12 of the transmission 6 may attempt to achieve an optimal compromise between cutting the torque $T_E$ delivered by the engine 4 and overlengthening the clutch 16B to decrease the rotation speed $\omega_E$ of the drive shaft 5 of engine 4 once clutch 16A has been completely opened.

In brief, an embodiment of the above-described control method for carrying out a gear shifting may have several advantages. Firstly, an embodiment of the above-described control method for carrying out a gear shifting may maximize performance during acceleration. Secondly, an embodiment of the above-described control method for carrying out a gear shifting may be easy and cost-effective to be implemented, as it may not require any installation of additional physical components and may not involve boosting the control unit 12 of the transmission 6 as it may not require any significant additional processing power.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. Control method for carrying out a gear upshifting in an automatic manual transmission having a dual-clutch gearbox to pass from a current shorter gear to a successive longer gear; the automatic manual transmission comprises a dual-clutch gearbox presenting two primary shafts, at least a secondary shaft connected to driving wheels and two clutches, each of which is interposed between a drive shaft of an engine and a corresponding primary shaft; the control method comprises the steps of:

receiving a gear shifting command;

opening a first clutch associated to the current gear;

closing a second clutch associated to the successive gear in a same first moment;

finishing the opening of the first clutch associated to the current gear and finishing the closure of the second clutch associated to the successive gear in a same closing moment;

keeping the rotation speed of the drive shaft constant and equal to an initial value imposed by the gear ratio of the current gear until the closing moment in which the opening of the first clutch is completed;

decreasing progressively, after the closing moment, the rotation speed of the drive shaft from the initial value imposed by the gear ratio of the current gear to a final value imposed by the gear ratio of the successive gear; and driving the second clutch after the closing moment for temporarily transmitting to the driving wheels an additional torque, so that the additional torque transmitted by the second clutch determines a progressive reduction of the rotation speed of the drive shaft from the initial value to the final value;

reducing the torque delivered by the engine after the closing moment to contribute to the progressive reduction of the rotation speed of the drive shaft from the initial value to the final value; and determining a desired drive style.

2. Control method according to claim 1 further comprising:

determining the time span during which the clutch transmits the additional torque depending on the desired drive style.

3. Control method according to claim 1 further comprising:

establishing the intensity of the additional torque transmitted by the second clutch after the closing moment and the corresponding decrease of the torque delivered by the engine after the closing moment depending on the desired drive style, so that the more the desired drive style is a sports drive style, the more the intensity of the additional torque transmitted by of the second clutch prevails on the decrease of the torque delivered by the engine and vice versa.

4. Control method according to claim 2 and comprising the further step of establishing the drive style depending on the settings chosen by the driver, on the rotation speed of the engine, and/or on the position of an accelerator pedal.

* * * * *